United States Patent [19]

LeRoy et al.

[11] Patent Number: 4,474,656

[45] Date of Patent: Oct. 2, 1984

[54] METHOD OF CONTROLLING THE POTENTIAL OF ELECTRICALLY-FLOATING COMPONENTS OF ELECTROLYZER CELLS

[75] Inventors: Rodney L. LeRoy, Pointe Claire; Richard Renaud, Dorion; Mohammed B. I. Janjua, Pincourt, all of Canada

[73] Assignees: Noranda Mines Limited; The Electrolyser Corporation Ltd., both of Toronto, Canada

[21] Appl. No.: 403,048

[22] Filed: Jul. 29, 1982

[30] Foreign Application Priority Data

Jul. 30, 1981 [CA] Canada .................................. 382890

[51] Int. Cl.³ .............................................. C25B 1/04
[52] U.S. Cl. .................................... 204/129; 204/196; 204/197
[58] Field of Search ................ 204/129, 248, 196–197, 204/147, 1 R

[56] References Cited

U.S. PATENT DOCUMENTS 4,160,704  7/1979  Kuo et al. ............................ 204/129
4,345,982  8/1982  Ikawa et al. ......................... 204/129

FOREIGN PATENT DOCUMENTS 408311 11/1942 Canada ................................ 204/129

OTHER PUBLICATIONS

"The Influence of Oxide Films on Stress Corrosion Cracking of Carbon Steels", by M. J. Humphries and R. N. Parkins, *Proceedings of Conference on Fundamental Aspects of Stress Corrosion Cracking*, pp. 384–395, NACE 1969.

Primary Examiner—R. L. Andrews
Attorney, Agent, or Firm—Fleit, Jacobson, Cohn & Price

[57] ABSTRACT

A method of reducing the overvoltages for hydrogen and oxygen evolution in alkaline water electrolyzers while preventing displacement of the potential of electrically-floating cell components to a region where they are susceptible to corrosion is disclosed. The method comprises adding to the electrolyte between 0.01 and 10 gpl of vanadium ions and controlling the potential of the electrically-floating cell components so as to maintain such potential out of the region where corrosion cracking may occur by simultaneously adding between 0.1 and 20 gpl chromium ions to the electrolyte, or by using an electrical circuitry requiring no external source of power.

10 Claims, 6 Drawing Figures

METHOD OF CONTROLLING THE POTENTIAL OF ELECTRICALLY-FLOATING COMPONENTS OF ELECTROLYZER CELLS

This invention relates to a method of reducing the overvoltages for hydrogen and oxygen evolution in alkaline water electrolysers, and more particularly to a method of providing the desired overvoltage reductions while allowing the potential of the electrically-floating cell components to remain in a region where they are not susceptible to corrosion.

The overvoltages at the hydrogen and oxygen generating electrodes are major contributors to energy inefficiency in commercial water electrolysers. Based on thermodynamics, a voltage of only 1.19 V is required to decompose water, at an electrolyte temperature of 70° C. However, voltages of all commercial water electrolysers are substantially greater than this value. Much of the inefficiency is due to the electrode overvoltages, which total approximately 700 mV at an applied current density of 150 mA/cm$^2$, when methods of electrode activation are not used. This total value is approximately the same for commercial bipolar and unipolar cells having mild-steel cathodes and nickel or nickel-plated anodes.

It is well known that the electrode overvoltages can be significantly reduced by heterogeneous treatment of the anode and/or the cathode. A large number of such treatments have been described in the literature. They include, for example, increasing of microscopic electrode surface area using sintered nickel powders, electrodeposition of high-surface area nickel or iron coatings, thermal decomposition of nickel, iron, or cobalt salts, and many related methods. Other electrode treatments are based on chemical modification of the electrode surfaces, using semi-conducting oxides, perovskite structures, boride compounds, molybdates, sulfides, and nickel-cobalt thiospinels.

All of these methods of electrode modification to reduce overvoltages are relatively costly, even though non-noble metals are normally used. Typical treatment costs are presently $2 to $10 or more per square foot of active electrode area. In spite of these costs, these methods of activation are unavoidable if very high levels of electrolyser efficiency are to be achieved.

Another method of reducing overvoltages is the addition of suitable homogeneous catalysts to the electrolyte. An example is the addition of between 30 mg and 10 g of vanadium per liter of electrolyte, as described by Sutherland in Canadian Pat. No. 408311 issued Nov. 3, 1942. For a cell operating at 65 asf with 25% KOH electrolyte at 70° C., for example, addition of 300 mg of vanadium per liter was observed to lower cell voltage by 50 mV. Applicants have measured similar effects, and have found them to increase with increasing current densities. The beneficial effect of vanadium is observed to increase with increasing current density, to levels much greater than those claimed by Sutherland. The beneficial effect is observed to be approximately equally divided between reduction of the anode overvoltage and of the cathode overvoltage. Other additives have also been shown to have a beneficial effect, including chromates and molybdates. None of these, however, offers cell-voltage reductions as great as those achieved through vanadium addition.

The voltage benefits resulting from vanadium addition are relatively modest, in the range of 150–250 mV, for current densities typical of commercial electrolyser equipment. However, if the resulting efficiency levels are acceptable in a particular application, this method of activation can be extremely cost effective. The cost of activation by addition of vanadium or another suitable homogeneous catalyst is much less than $1 per square foot.

However, apart from reducing the voltage of a water electrolyser, vanadium has been observed to have a second effect which has prevented its use in unipolar water electrolysers. In general, all or a portion of the containment structure of a unipolar water electrolyser is fabricated from steel or from nickel-plated steel and is electrically insulated from the anode and cathode so that it constitutes an electrically-floating component. Typically, in an electrolyser operating at 1.9–2.1 V, the voltage measured between the cathode and the electrically-floating components of the tank is between 1.0 V and 1.4 V.

Vanadium addition has been found to have a strong effect on the potential of the electrically-floating components of the tank. Indeed, addition of 0.1 gpl of vanadium has been found to reduce the cathode to tank potential down to 0.75 V. Further reduction in the measured voltage to 0.45 V occurred when the vanadium concentration was increased to 1.0 gpl. Noting that the hydrogen overvoltage on an unactivated cathode is typically 350 mV, cathode to tank potentials of 400 mV to 700 mV are equivalent to absolute potentials of the electrically-floating tank components with respect to the electrolyte of −900 mV to −600 mV, on the hydrogen scale, which is precisely the range in which mild steel is susceptible to stress corrosion cracking, as disclosed by M. J. Humphries and R. M. Parkins, in an article entitled "The Influence of Oxide Films on Stress Corrosion Cracking of Carbon Steels", Proceedings of Conference on Fundamental Aspects of Stress Corrosion Cracking, pages 384–385, NACE 1969. Thus, in spite of its usual depolarizing effect, and low cost, vanadium electrolyte additions cannot apparently be used in commercial electrolysers which have electrically-floating components fabricated from steel or nickel-plated steel.

Applicants have surprisingly found, in accordance with a first embodiment of the present invention, that vanadium ions can be used as an electrolyte additive in alkaline water electrolysers to reduce the overvoltages for hydrogen and oxygen evolution when chromium ions are simultaneously added to the electrolyte to control the potential of the electrically floating components of the electrolysers so as to maintain such potential out of the region where corrosion cracking is likely to occur. Chromium addition to an electrolyser results in a reduction of the overvoltages for hydrogen and oxygen evolution which, although significant, is lower than that observed on vanadium addition. However, the surprising observation is that, following chromium addition, the cathode to electrically-floating tank components voltage increased, rather than decreasing as it did on vanadium addition, to a value which is outside the range where corrosion cracking has been observed.

The vanadium and chromium compounds which can be used are those which provide stable anionic forms in alkaline medium. The stable vanadium forms are the pentavalent orthovanadate ion ($VO_4^{3-}$) and the tetravalent hypovanadate ion ($HV_2O_5^-$). The stable chromium forms are the hexavalent chromate ion ($CrO_4^{2-}$) and the trivalent chromite ion ($CrO_2^-$ or $CrO_3^{3-}$).

The preferred vanadium compounds are $V_2O_5$, $VO_2$ ($V_2O_4$) or $V_2O_3$. The following sodium salts could also be used: $NaVO_3$ (metavanadate), $Na_3VO_4$ (orthovanadate) or its hydrated forms $Na_3VO_4 \cdot 10H_2O$ (or $16H_2O$), and $Na_4V_2O_7$ (pyrovanadate). The most preferred vanadium compound is $V_2O_5$. This compound is soluble in potassium hydroxide. Potassium salts could also be used provided that they are soluble in alkaline medium.

The preferred chromium compounds are the dichromates of sodium and potassium $Na_2Cr_2O_7 \cdot 2H_2O$ (or $10H_2O$) and $K_2Cr_2O_7$. The chromates $Na_2CrO_4$ and $K_2CrO_4$ may also be used. The most preferred chromium compound is $Na_2Cr_2O_7 \cdot 2H_2O$ in its dihydrated form because of its high solubility in water, which permits preparation of concentrated solutions. Chromium oxides soluble in alkaline medium could also be used as well as other alkali metal salts, such as Li, which are soluble in alkaline medium.

The vanadium concentrations added to the electrolyte are between 0.01 and 10 gpl, preferably between 0.1 and 1.0 gpl. Chromium concentrations are between 0.1 and 20 gpl, preferably between 0.2 and 4.0 gpl.

The above method of controlling the potential of the electrically-floating components of a cell, which is based on the use of chemical additives containing chromium, has the disadvantage that the concentrations of the chemical or chemicals used can vary with time, and it is necessary to make provision for monitoring and incremental additions during the lifetime of the equipment. An alternative approach to elimination of the stress-corrosion-cracking problem would be to control directly the potential of the tank components concerned. The use of anodic and cathodic protection of metal structures is well known. However, ancillary power supplies, often under potentiostatic control, are required. Such equipment would have to be repeated for all of the cells of an electrolyser plant, resulting in a significant increase in complexity and cost. The operational simplicity of water electrolyser plants would be severely compromised.

It has been found in accordance with a second embodiment of the invention that the potential of the electrically-floating cell components can be controlled by the use of a simple circuit requiring no external source of power. The circuit can be specified, based on an understanding of the electrochemical processes which are responsible for the measured potential of the electrically-floating components. The basic circuit preferably comprises external resistances $R_a^E$ and $R_c^E$ which are connected between the anode and cathode terminals, respectively, and the electrically-floating cell component whose potential is to be controlled. These resistances are electrically in parallel with the internal anode and cathode cell resistances $R_a^i$ and $R_c^i$, respectively, where these resistances represent currents passing by electrochemical reactions between the electrodes and the electrically-floating component. A single resistance interconnecting the anode to the electrically-floating components could also be used.

The invention will now be disclosed, by way of example, with reference to the accompanying drawings in which.

Figure 1:
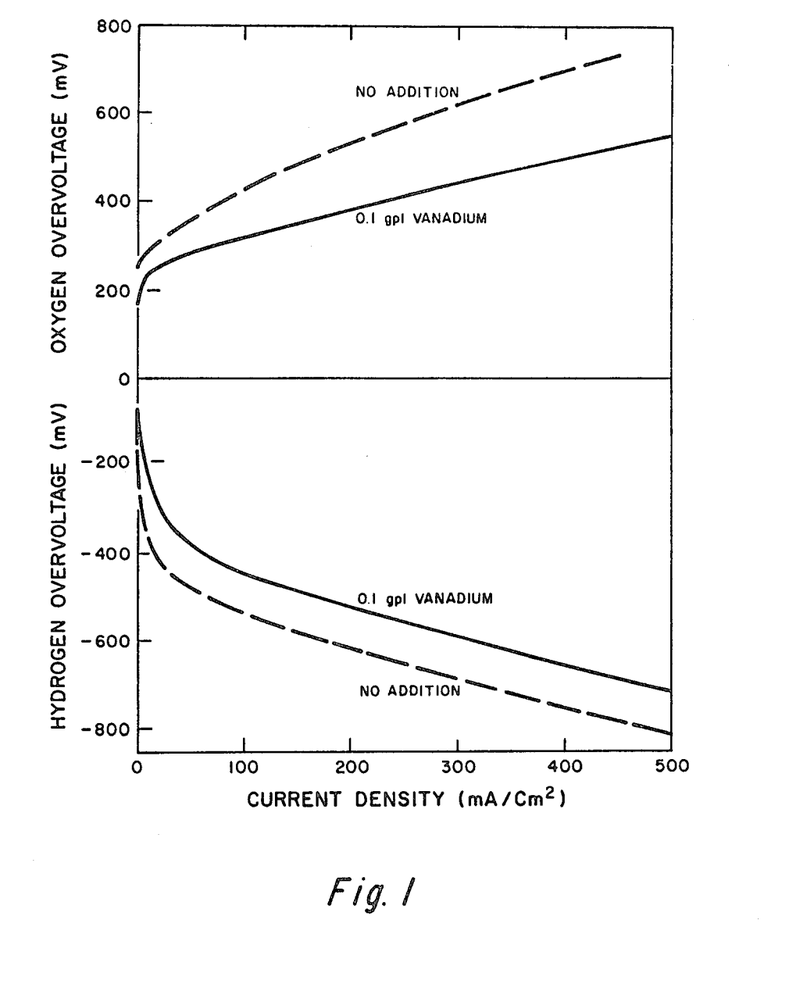
FIG. 1 illustrates the anodic and cathodic polarization measurements on nickel foil and 1010 steel, respectively, as a function of current density in 28% KOH at 70° C., with and without addition of 0.1 gpl of vanadium.

FIG. 1 illustrates anodic and cathodic polarization curves on nickel foil and 1010 steel, respectively, in 28% KOH at 70° C. at an applied current density varying from 0 to 500 mA/cm$^2$. The dashed line is with no electrolyte additive and the full line with the addition of 0.1 gpl vanadium. It is seen that the addition of vanadium reduces the oxygen and hydrogen overvoltages and that the beneficial effect of vanadium addition even increases with increasing current density.

Figure 2A:
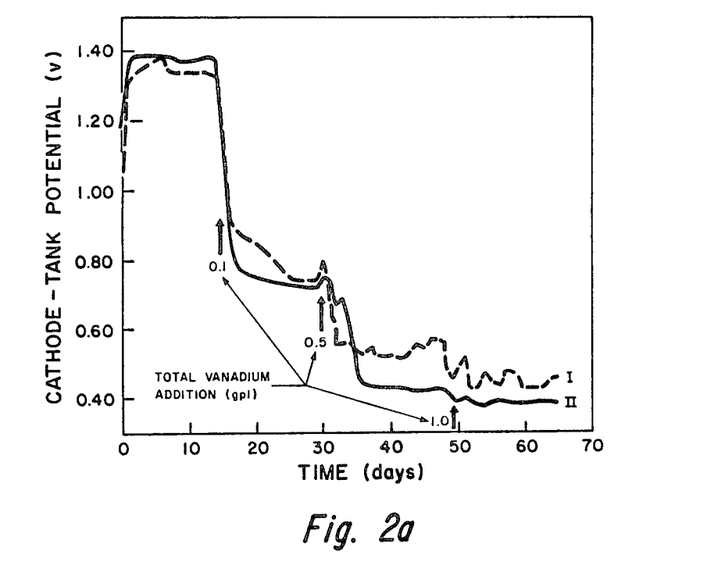
FIGS. 2a and 2b illustrate, respectively, the cathode-tank and cell voltage results of duplicate experiments in two electrolysers, with addition of vanadium to the levels of 0.1, 0.5, and 1.0 gpl at a current density of 180 mA/cm$^2$ in 28% KOH at 70° C.
Figure 2B:
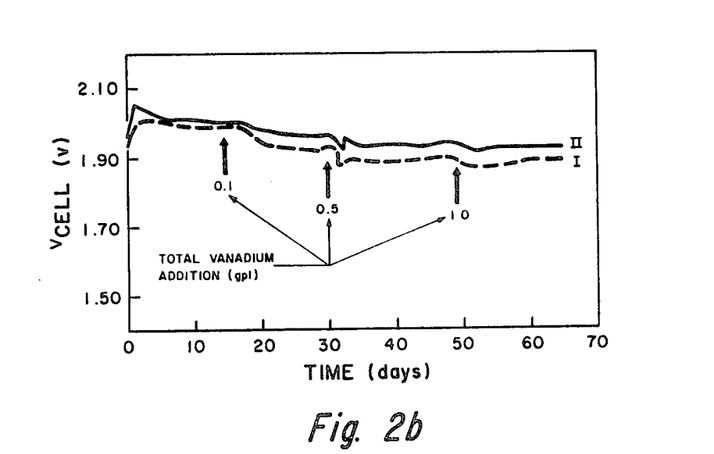

FIG. 2a shows the cathode to tank potential measured in two experimental electrolysers operated at a current density of 180 mA/cm$^2$ over a period of 65 days. Additions of 0.1, 0.4 and 0.5 gpl of vanadium (as vanadium pentoxide) were made after 14, 30 and 49 days. The major effect on cathode to tank potential occurred following the first addition, with the measured voltage falling from 1.35 V to 0.75 V. Further reductions in the measured voltage to 0.45 V occurred when the vanadium concentration was increased to 1.0 gpl (after the third addition). FIG. 2b shows the corresponding cathode-anode cell voltage $V_{cell}$ in volts. Since less significant changes in cathode to tank potential and cathode-anode cell voltage were obtained by the addition of 1 gpl of vanadium, it is believed that the vanadium addition should not be higher than 10 gpl for economical reasons. The above curves clearly illustrate that the addition of vanadium moves the potential of the electrically floating component of the cell within the range in which mild steel, which is commonly used for the manufacture of the tank and other electrically floating components of the cell, is susceptible to stress corrosion cracking ($-900$ mV to $-600$ mV NHE).

Figure 3:
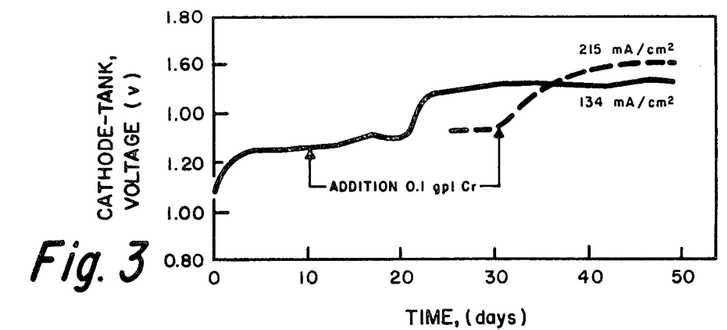
FIG. 3 illustrates the cathode-tank voltage obtained at two current densities in 1000-A experimental cells by the addition of 0.1 gpl Cr in 28% KOH at 70° C.

FIG. 3 shows the results of addition of 0.1 gpl of chromium (as potassium dichromate) to two 1,000-A unipolar test cells operated at 134 mA/cm$^2$ (full line) and 215 MA/cm$^2$ (dashed line). It is seen that the cathode to tank voltage increased rather than decreasing as it did on vanadium addition. The cathode to tank voltage increased by about 300 mV in the 15 days following chromate addition.

The surprising results obtained by the addition of a mixture of vanadium and chromium to the electrolyte of an alkaline water electrolyser have been confirmed by the following examples:

EXAMPLE 1

Test Conditions: 1000-A test cell, 28% KOH, 70° C., 125 asf

Electrodes: Mild steel cathodes, nickel-plated steel anodes.

| Catalyst Addition | Time From Test Commencement | Stable Voltage (V) | |
|---|---|---|---|
| | | Cathode-Tank | Cathode-Anode |
| 0 | 0–27 days | 1.25 | 2.05 |
| 0.1 gpl vanadium (as $V_2O_5$) | 27–615 days | 0.76 | 1.88 |
| 0.1 gpl chromium (as $K_2Cr_2O_7$) | 615–646 days | 0.95 | 1.83 |

In this case, 0.1 gpl vanadium addition decreased the cathode to tank potential by 490 mV to a value of 760 mV which is close to the upper limit of the 400–700 mV range where corrosion cracking might occur. Subsequent chromium addition increased the potential of the electrically-floating tank by 190 mV, to a value of 950 mV where stress corrosion cracking is unlikely to occur. The chromium addition had no detrimental effect on the cathode-anode voltage.

EXAMPLE 2

Test Conditions: 1000-A test cell, 28% KOH, 70° C., 125 asf

Electrodes: High Surface area nickel anodes and cathodes.

| Catalyst Addition | Time From Test Commencement | Stable Voltage (V) | |
|---|---|---|---|
| | | Cathode-Tank | Cathode-Anode |
| 0.1 gpl vanadium | 0–33 days | 0.38 | 1.70 |
| 0.2 gpl chromium | 33–69 days | 0.88 | 1.70 |
| 0.5 gpl chromium | 69–84 days | 0.96 | 1.72 |

This example demonstrates that a similar beneficial effect of chromium addition to a vanadium-containing cell is observed when activated electrodes are used. In this case the potential of the electrically-floating tank is increased from 380 mV which is close to the range of 400–700 mV where stress corrosion cracking may occur, to a value of 880 mV. Increase of the chromium level to 0.5 gpl further displaced the potential of the electrically-floating component away from the danger region, by a further 80 mV. The chromium addition had no detrimental effect on the cathode-anode voltage.

EXAMPLE 3

Test Conditions: 10 kA commercial electrolyser, 85 asf, 60° C., 28% KOH

Electrodes: Mild steel cathodes, nickel-plated anodes.

| Catalyst Addition | Time from Test Commencement | Stable Voltage (V) | |
|---|---|---|---|
| | | Cathode-Tank | Cathode-Anode |
| 0.2 gpl vanadium | 0–540 days | 0.40 | 1.87 |
| 0.6 gpl chromium | 540–575 days | 1.20 | 1.87 |

In this case, the potential of the electrically-floating tank increased from 400 mV (at the lower limit of the danger region) to 1200 mV which is safely above the upper limit of the danger region, and the cathode-anode voltage was not changed.

EXAMPLE 4

Test Conditions: 1000-A test cell, 25% KOH, 70° C., 125 asf

Electrodes: High surface area nickel anodes and cathodes.

| Catalyst Addition | Time From Test Commencement | Stable Voltage | |
|---|---|---|---|
| | | Cathode-Tank | Cathode-Anode |
| 1.0 gpl vanadium | 0–670 days | 0.24 | 1.84 |
| 0.2 gpl chromium | 670–780 days | 1.01 | 1.83 |
| 4.0 gpl chromium | 780–817 days | 1.08 | 1.84 |

This example demonstrates again the ability of chromium to remove the cathode-to-tank potential out of the stress-corrosion-cracking range, even at relatively high vanadium concentration. Addition of 1.0 gpl vanadium resulted in a decrease of the cathode-to-tank voltage to 240 mV which is close to the stress corrosion-cracking range when using the above mentioned activated cathodes. Subsequent addition of 0.2 gpl chromium increased the cathode-to-tank potential by 770 mV, bringing the tank in a safe potential range. Finally, addition of 4.0 gpl chromium shows that it is possible to use high concentration of chromium with no detremental effects on the cell voltage. The cathode-to-tank potential was also displaced further in the safe potential region, but since such displacement was not substantial, it is preferable for economical reasons, to keep the chromium concentration less than 20 gpl.

Experiments have been carried out to establish the origin of the effects which chromium and vanadium have on the potential of electrically-floating tank components. The following explanation is believed to be true, although the invention is in no way dependent on its validity.

The potential of electrically-floating cell components is determined by electrochemical currents passing from anode to cathode, via the metallic cell components. The principal processes have been shown to be the following:

(i) Oxygen evolution on the anode: $4OH^- \rightarrow O_2 + 2H_2O + 4e^-$ (ii) Oxygen reduction on the cell components close to the anode: $O_2 + 2H_2O + 4e^- \rightarrow 4OH^-$ (iii) Electronic current transfer through the metallic cell components from the vicinity of the cathode.

(iv) Hydrogen oxidation on cell components close to the cathode $2H_2 + 4OH^- \rightarrow 4H_2O + 4e^-$ (v) Hydrogen evolution on the cathode: $4H_2O + 4e^- \rightarrow 4OH^- + 2H_2$.

The potential of the electrically-floating tank components is determined by the resistances of these processes: the cathode to tank component voltage is the sum of the electrode overvoltages for reactions (iv) and (v); while the anode to tank component voltage is the sum of the overvoltages for reactions (i) and (ii). The contribution of ionic resistance to both voltages is small and can be neglected, because of the very small currents which flow through the electrically-floating cell components, normally much less than 0.1% of the total cell current.

As illustrated by the example of FIG. 1, vanadium addition has approximately equal effects on reactions (i) and (v), so these are not responsible for the observed decrease in cathode-floating component potential. Extensive laboratory experiments have demonstrated that the vanadium addition has little effect on the hydrogen oxidation reaction (iv), but that it strongly inhibits the oxygen reduction reaction (ii), thus increasing the overvoltage for this process and decreasing the cathode to floating component potential, as is observed.

Chromium addition has been found to have a significant effect in reducing the hydrogen-evolution overvoltage, while having a relatively modest effect on the oxygen-evolution reactions. However, its major influence is believed to be inhibition of the hydrogen-oxidation reaction (iv) on the electrically-floating components, thus causing the observed increase in cathode to electrically-floating components voltage.

Figure 4:
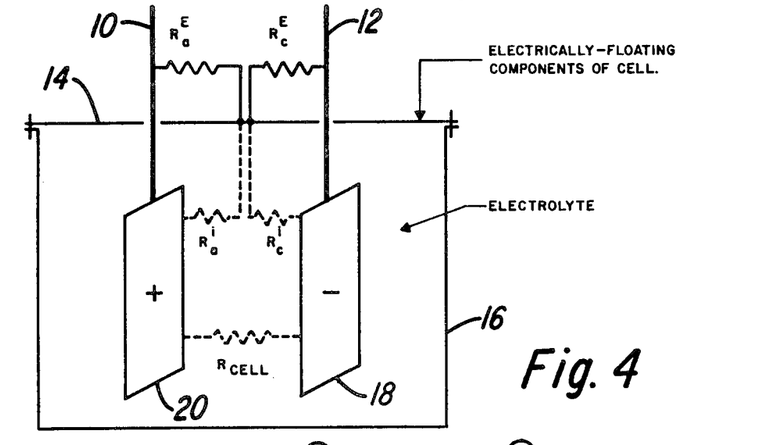
FIG. 4 is a schematic diagram of an electrical circuit used to control the potential of the electrically-floating cell components.

FIG. 4 illustrates an electrical circuit for controlling the potential of the electrically-floating cell components which does not require any external source of power. The basic circuit comprises external resistances $R_a^E$ and $R_c^E$ which are connected between the anode and cathode terminals 10 and 12, respectively, and the electrically-floating component 14 of a cell 16. These resistances are electrically in parallel with the internal resistances $R_a^i$ and $R_c^i$ respectively, where these resistances represent currents pasing by electrochemical reactions between the cathode and anode 20 and 18, respectively, and the electrically floating component 14 of the cell. The predominant reactions paths are described in the first part of this disclosure.

The resistance $R_{cell}$ is the effective resistance of the principal reaction ocuring in the cell, for example the electrolytic decomposition of water to give oxygen at the anode and hydrogen at the cathode.

Figure 5:
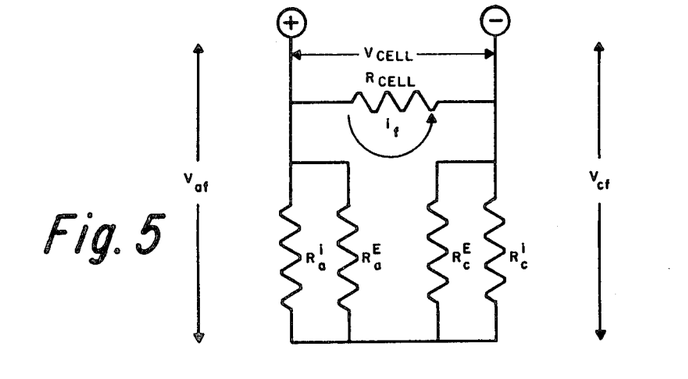
FIG. 5 is the equivalent circuit of the system shown in FIG. 4.

FIG. 5 presents an electrical circuit which is equivalent to the situation of FIG. 4. The current $i_f$ in this case is the total current which passes from anode to cathode with part of the current path including the electrically-floating components of interest. $V_{cf}$ (or $V_{af}$) is the potential between the cathode and the electrically-floating component (or between the anode and the electrically-floating component) which it is desired to control so that stress corrosion cracking can be avoided.

The effective resistance $R_{eff}$ of the circuit from the anode to cathode via the electrically-floating tank components (cf FIG. 5) may be written as $$R_{eff} = \left( \frac{1}{R_a^i} + \frac{1}{R_a^E} \right)^{-1} + \left( \frac{1}{R_c^i} + \frac{1}{R_c^E} \right)^{-1} \quad (1)$$

while the current flowing through this resistance is $$i_f = V_{cell}/R_{eff}. \quad (2)$$

The potential between the cathode and the floating components, $V_{cf}$, is selected as the parameter which it is desired to control. It may be written $$V_{cf} = i_f \left( \frac{1}{R_c^i} + \frac{1}{R_c^E} \right)^{-1} \quad (3)$$

The potential between the anode and the floating components may be calculated as $$V_{af} = V_{cell} - V_{cf} \quad (4)$$

It is clear from examination of these equations that the potential of the electrically-floating components could be varied at will by varying the values of the external resistors, if the values of the electrochemical resistances $R_a^i$ and $R_c^i$ were known. In terms of the resistance parameters and the cell voltage, the potential to be controlled may be written as $$V_{cf} = V_{cell} \frac{\left( \frac{1}{R_c^i} + \frac{1}{R_c^E} \right)^{-1}}{\left( \frac{1}{R_a^i} + \frac{1}{R_a^E} \right)^{-1} + \left( \frac{1}{R_c^i} + \frac{1}{R_c^E} \right)^{-1}} \quad (5)$$

Presuming that the internal electrochemical resistances $R_c^i$ and $R_a^i$ are known, equation (5) can be used to determine the values of the external resistances which will give any desired potential of the floating components with respect to the cathode. The values of the internal resistances can be estimated from the electrolyser geometry and an understanding of the electrochemical processes taking place, or they be determined from preliminary measurements on the cell as follows.

A relationship between the two resistance values is obtained by observing the value of the cathode-to-floating component potential $V_{cf}^o$ with no external resistors attached. Substituting $R_a^E = R_c^E = \infty$ in equation (5) where $V_{cf} = V_{cf}^o$ gives the result $$R_a^i/R_c^i = V_{cell}/V_{cf}^o - 1 = K$$

where this expression defines the parameter K. The internal resistances are, therefore, related by the expression $$R_a^i = K R_c^i \quad (6)$$

where K is known from the experimental data.

The separate values of the internal resistances are obtained by making measurements on the electrolyser with external resistances attached. Substitution of the equation (6) into equation (5) gives the following result for $R_c^i$:

$$R_c^i = \frac{1 + K - (V_{cell}/V_{cf})}{K \left( \frac{V_{cell}/V_{cf} - 1}{R_a^E} - \frac{1}{R_c^E} \right)} \quad (7)$$

If only a single external resistance is used, between the anode and the floating component, this result simplifies to $$R_c^i = R_a^E \left( \frac{1}{V_{cell}/V_{cf} - 1} - \frac{1}{K} \right). \quad (8)$$

The general validity of this model, and of the use of these two expressions to determine the values of the resistance parameters, will be demonstrated later but it will now be shown how the model can be used to establish the potential of the floating components at a desired value with respect to either the anode or the cathode.

The objective of this invention is specifically to establish the cathode to floating components potential at some pre-set value outside the range where corrosion cracking may occur, say at about 1.1 volt. This is equivalent to establishing the cathode-to-floating component potential at a preset value $V_{cf}^*$. To simplify the arithmetic, a parameter P is defined which is related to the desired potential:

$$P = (V_{cell}/V_{cf}^* - 1). \quad (9)$$

Substituting into equation (5) and re-arranging gives the result $$R_a^E = P\left(\frac{1}{R_c^i} - \frac{P}{R_a^i} + \frac{1}{R_c^E}\right)^{-1}. \quad (10)$$

Equation (10) contains both of the internal cell resistances, $R_c^i$ and $R_a^i$. A more-useful result is obtained by eliminating one of these parameters using equation (6):

$$R_a^E = P\left(\frac{1}{R_a^i}[K-P] + \frac{1}{R_c^E}\right)^{-1}. \quad (11)$$

Figure 6:
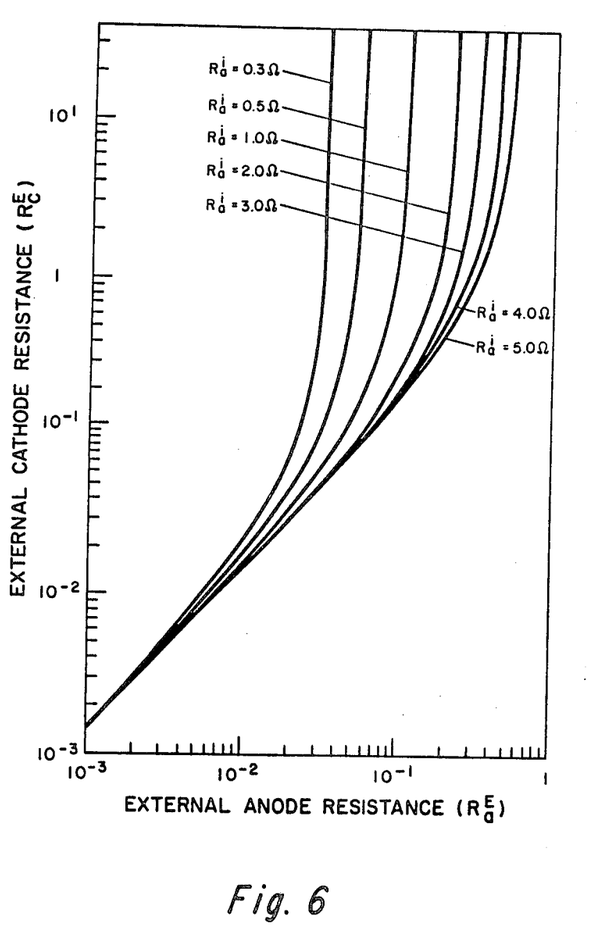
FIG. 6 is a diagram which can be used for the selection of the external resistances of the circuit of FIGS. 4 and 5.

FIG. 6 presents typical characterization curves calculated from equation (11). The value of K used was taken for a typical vanadium-containing electrolyser for which $V_{cf}$ was equal to 0.235 V, while the cell voltage was 1.842 V. Thus K=6.8. The desired value of the cathode-to-floating component potential was established by setting $V_{cf}^*$ at 1.1 volt and thus making P=0.67.

Uses of curves such as those of FIG. 6 will allow the desired potential of the electrically-floating components to be achieved for any values of the internal cell resistances, by appropriate selection of the two external resistance values. A similar result could clearly be achieved using only a resistance between the anode and the electrically-floating component. In this case, equation (11) reduces to $$R_a^E = P R_a^i/(K-P). \quad (12)$$

It follows that the value of the external resistance to be used is a simple linear function of the internal resistance between the anode and the electrically-floating component.

Use of a single external resistance (equation (12)) has the advantage of simplicity, and of reducing the current lost through external resistances to an absolute minimum. It has the disadvantage, however, that the correct value of the external resistance is a strong function of the internal resistance $R_a^i$, and uncertainty in knowledge of this latter parameter can result in large errors in achieving the desired correction. With reference to FIG. 6, it is clear that using external anode and cathode resistances, resistance values can be established in a range where the resulting potential is relatively insensitive to the estimate of $R_a^i$.

This embodiment of the invention will now be demonstrated with reference to the following Examples:

EXAMPLE 5

Table I records an example of use of this invention with a 1-kA unipolar electrolyser. Resistances $R_a^E$ and $R_c^E$ were connected between the anode and cathode respectively and the electrically-floating cell tank.

TABLE I

EXAMPLE OF POTENTIAL CONTROL OF ELECTRICALLY-FLOATING COMPONENTS OF A 1-kA ELECTROLYSER, USING EXTERNAL ANODE AND CATHODE RESISTANCES

| $R_a^E$ (ohm) | $R_c^E$ (ohm) | $V_{cf}$ (V) | $V_{cell}$ (V) | $R_c^i$ (eq. (7)) (ohm) | $R_a^i$ (eq. (6)) (ohm) |
|---|---|---|---|---|---|
| ∞ | ∞ | 0.235[a] | 1.842 | — | — |
| 1.0 | 12.4 | 0.667 | 1.842 | 0.44 | 3.0 |
| 1.0 | 10.9 | 0.698 | 1.842 | 0.49 | 3.4 |
| 1.0 | 9.21 | 0.710 | 1.842 | 0.52 | 3.5 |
| 1.0 | 7.56 | 0.710 | 1.842 | 0.52 | 3.6 |
| 1.0 | 6.08 | 0.699 | 1.842 | 0.52 | 3.5 |
| 1.0 | 4.46 | 0.688 | 1.842 | 0.52 | 3.6 |

[a]K = 6.84

The results obtained with no external resistors attached were used to calculate the value of K=6.84. Using this result, the values of the internal resistances were calculated for each of the remaining six pairs of resistances. Note that as the external cathode resistor is decreased in value, the voltage between the cathode and the electrically-floating components passes through a maximum. This maximum is lower than the desired value of approximately 1.1 V, indicating that a lower value of the external anode resistance must be used. The internal cell resistances calculated from these measurements are approximately constant as the external cathode resistance is varied by a factor of almost three.

EXAMPLE 6

Table II records a second example, in which the resistance of the external anode resistance is reduced by a factor of two, to 0.5 ohm.

TABLE II

EXAMPLE OF POTENTIAL CONTROL OF ELECTRICALLY-FLOATING COMPONENTS OF A 1-kA ELECTROLYSER, USING EXTERNAL ANODE AND CATHODE RESISTANCES

| $R_a^E$ (ohm) | $R_c^E$ (ohm) | $V_{cf}$ (V) | $V_{cell}$ (V) | $R_c^i$ (eq. (7)) (ohm) | $R_a^i$ (eq. (6)) (ohm) |
|---|---|---|---|---|---|
| ∞ | ∞ | 0.235[a] | 1.842 | — | — |
| 0.5 | 15.22 | 0.978 | 1.842 | 0.51 | 3.5 |
| 0.5 | 13.62 | 1.040 | 1.842 | 0.60 | 4.1 |
| 0.5 | 12.42 | 1.074 | 1.842 | 0.66 | 4.5 |
| 0.5 | 10.85 | 1.080 | 1.842 | 0.68 | 4.7 |
| 0.5 | 9.21 | 1.099 | 1.842 | 0.72 | 5.0 |
| 0.5 | 7.56 | 1.103 | 1.842 | 0.75 | 5.1 |
| 0.5 | 6.08 | 1.100 | 1.842 | 0.76 | 5.2 |
| 0.5 | 4.46 | 1.084 | 1.842 | 0.76 | 5.2 |
| 0.5 | 3.16 | 1.069 | 1.842 | 0.79 | 5.4 |
| 0.5 | 1.46 | 0.938 | 1.842 | 0.69 | 4.7 |
| 0.5 | 0.84 | 0.771 | 1.842 | 0.50 | 3.4 |

[a]K = 6.84

In this case, the calculated resistance values are somewhat higher, although they remain quite constant as the value of the external cathode resistance is varied by a factor of 18. In this case the potential between the cathode and the electrically-floating components passes through a maximum at a voltage which is close to the desired value. Other combinations of external anode and cathode resistances which would give the same result could be derived from equation (11) or FIG. 6.

EXAMPLE 7

Table III records an example of use of the method of this invention with an external anode resistance only, using a 3-kA unipolar electrolyser. Although the calculated values of the internal resistances increase somewhat with decreasing value of the applied external resistance, it is clear that a potential of the electrically-floating component in the desired range can be easily obtained by the method.

TABLE III
EXAMPLE OF POTENTIAL CONTROL OF ELECTRICALLY-FLOATING COMPONENTS OF A 3-kA ELECTROLYSER, USING AN EXTERNAL ANODE RESISTANCE ONLY

| $R_a^E$ (ohm) | $V_{cf}$ (V) | $V_{cell}$ (V) | $R_c^i$ (eq. (8)) (ohm) | $R_a^i$ (eq. (6)) (ohm) |
|---|---|---|---|---|
| ∞ | 0.435[a] | 1.720 | — | — |
| 4.9 | 0.670 | 1.720 | 1.47 | 4.3 |
| 1.9 | 0.945 | 1.720 | 1.67 | 4.9 |
| 1.4 | 1.092 | 1.720 | 1.96 | 5.8 |
| 1.0 | 1.235 | 1.720 | 2.21 | 6.5 |
| 0.7 | 1.360 | 1.720 | 2.41 | 7.1 |
| 0.5 | 1.450 | 1.720 | 2.51 | 7.4 |

[a] $K = 2.95$

We claim:

1. In a method of reducing the overvoltages for hydrogen and oxygen evolution in an alkaline water electrolyzer cell having anodic and cathodic electrodes, the method comprising adding a positive amount up to 10 gpl of vanadium-containing ions to the electrolyte, the improvement comprising controlling the potential of the electrically-floating components of the cell which are not in contact with the anodic and cathodic electrodes so as to maintain said potential at a value intermediate between that of the anodic and cathodic electrodes and which is out of the region where said components are susceptible to stress corrosion cracking.

2. A method as defined in claim 1, wherein the vanadium ions originate from vanadium compounds which provide anionic stable forms in alkaline medium.

3. A method as defined in claim 2 wherein the vanadium compound is $V_2O_5$.

4. A method as defined in claim 1, 2 or 3, wherein the potential of the further electrically floating components of the cell is controlled by the addition of a positive amount up to 20 gpl of chromium-containing ions to the electrolyte.

5. A method as defined in claim 4, wherein the chromium ions originate from chromium compounds which provide anionic hexavalent or trivalent stable forms in alkaline medium.

6. A method as defined in claim 5 wherein the chromium compound is a dichromate of potassium or sodium.

7. A method as defined in claim 4, 5 or 6 wherein the concentration of chromium ions is between 0.2 and 4.0 gpl.

8. A method as defined in claims 1, 2 or 3, wherein the potential of the electrically-floating components of the cell is controlled by interconnecting at least one of the anodic and cathodic electrodes of the cell to the electrically-floating components thereof through an electrical circuit including an external resistance which is effectively connected in parallel with internal resistance of the anode and cathode.

9. A method as defined in claim 8, wherein said electrical circuitry includes a first and second external resistance interconnecting the cathode and the anode of the cell, respectively, to the electrically-floating components of the cell.

10. A method as defined in claim 8, wherein said electrical circuitry include an external resistance interconnecting the anode of the cell to the electrically-floating components of the cell.

* * * * *

UNITED STATES PATENT AND TRADEMARK OFFICE
CERTIFICATE OF CORRECTION

PATENT NO.  : 4,474,656

DATED       : October 2, 1984

INVENTOR(S) : RODNEY L. LeROY et al

It is certified that error appears in the above-identified patent and that said Letters Patent is hereby corrected as shown below:

Column 6, line 54, change "43" to --$4e^- \rightarrow$--.

Column 11, after "We claim:," substitute

--1. In a method of reducing the overvoltages for hydrogen and oxygen evolution in an alkaline water electrolyzer cell having anodic and cathodic electrodes and having electrically floating components of iron-containing alloys not in direct electrical contact with the anodic or cathodic electrodes, the method comprising adding a positive amount up to 10gpl of vanadium-containing ions to the electrolyte, the improvement comprising controlling the potential of the electrically-floating components of the cell so as to maintain said potential at a value between that of the anodic and cathodic electrodes and which value is out of the region where said components are susceptible to stress corrosion cracking.--.

Column 12, line 4, delete "further";

line 5, after "the" (second occurrence) insert --further--.

Signed and Sealed this

Fifth Day of November 1985

[SEAL]

Attest:

Attesting Officer

DONALD J. QUIGG

Commissioner of Patents and Trademarks